May 21, 1940.  C. ARNDT  2,201,282
SEPARATOR
Filed Jan. 19, 1937
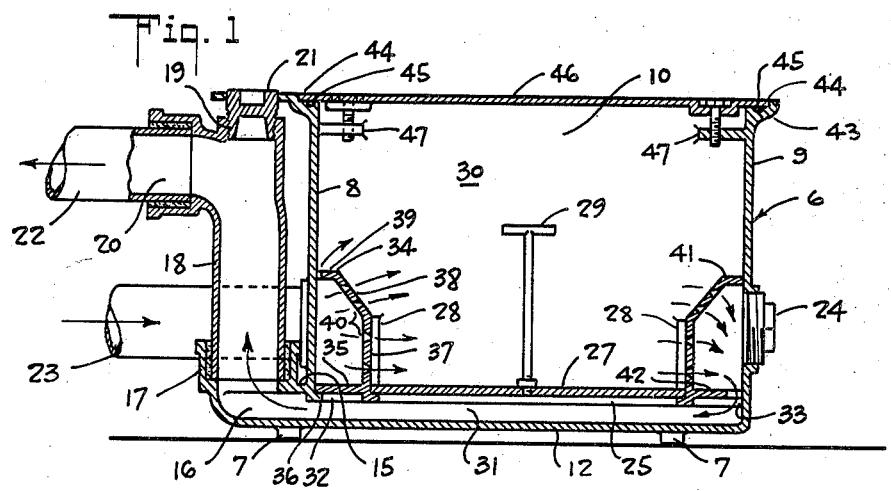
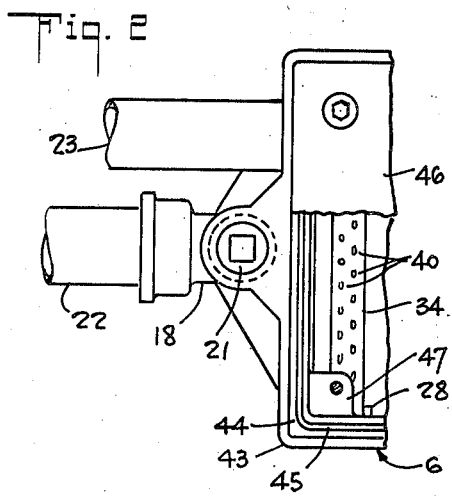
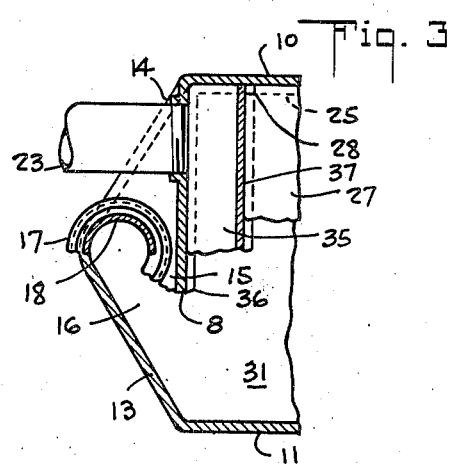
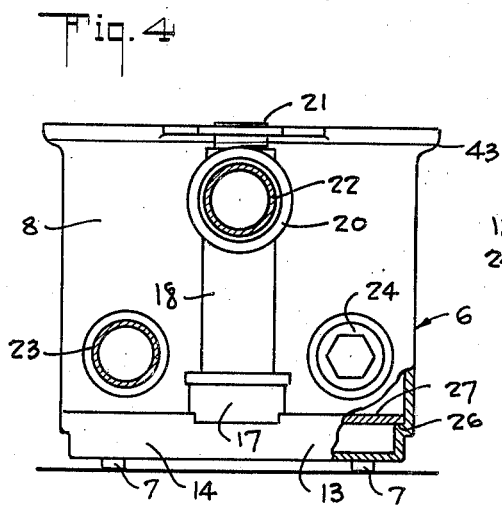
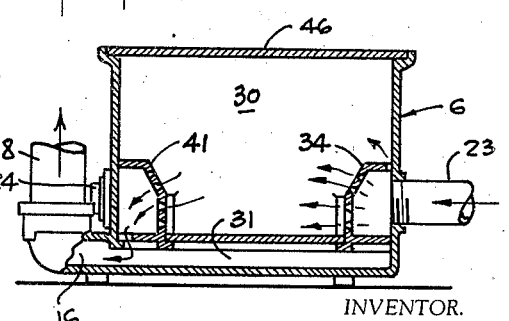
INVENTOR.
Charles Arndt
BY Joseph F Westall
ATTORNEY.

Patented May 21, 1940

2,201,282

UNITED STATES PATENT OFFICE 2,201,282

SEPARATOR

Charles Arndt, Los Angeles, Calif.

Application January 19, 1937, Serial No. 121,299

11 Claims. (Cl. 210—56)

This invention relates to separators to clarify waste fluids containing materials of different specific gravity or density, and particularly contemplates improvements in the separator of Letters Patent 1,760,229, granted to me May 27, 1930.

Separators of the character commonly employed to clarify waste waters in drains and the like usually consist of a container placed in the fluid conduit and through which the fluid may flow at a reduced rate to permit the lighter constituents of the fluid to rise to the surface for subsequent manual removal. To enjoy the advantages of universal utility, such containers must be adapted for connection with numerous variations in the arrangement of plumbing facilities.

Such prior art devices are often ineffective in separating fast flowing fluids due to failure to provide means to insure a uniform rate of flow through the container, which results in the formation of a direct current from the inlet pipe to the exit pipe without allowing sufficient time or quiescence of the fluid for the separation to take place. To partially obviate the aforementioned difficulties, larger containers have been employed, but due to the usual necessity for conservation of installation space, their utility is accordingly limited.

It is a principal object of the present invention to provide a separator to efficiently divide the lighter constituents from a continuous flow of fluid through a trap by reducing velocity and agitation of the fluid, embodying means to insure a uniform rate of flow through the trap and thereby enable the accurate determination of a capacity rating of efficiency for such separators and permits the adaptation of the proper separator to meet particular requirements for any flow of fluid by a consideration of the different specific gravities of the constituents of the fluid to be separated, the time of passage, and rate of flow under definite pressure.

Another object is the provision of a restrictor for the outlet opening of a grease trap having a series of perforations therein disposed across the flow of the fluid through the trap to prevent premature concentration of the fluid as a current from the inlet opening, and thereby facilitate flow of all fluid through the separator at a predeterminable velocity.

Another object is to provide a separator adapted for installation with any of a wide variety of plumbing fixtures having a series of inlet openings and an adjustable exit opening in combination with a pair of baffles for the inlet and exit openings, respectively, to control the rate of flow, the baffles being interchangeable for convenient utility with the specific inlet opening employed.

Other objects and salient features of my invention, such, for example, as economy of construction, simplicity of design, ease of assembly and of removal of the separated waste matter, durability, and adaptability in use to established plumbing facilities, will be apparent to those of skill in this art upon an examination of the following description read in the light of the accompanying drawing, in which—

Fig. 1 is a sectional view of my invention;

Fig. 2 is a plan view of one end of the separator with the cover therefor partially broken away;

Fig. 3 is a sectional view of the outlet end hereof;

Fig. 4 is an end elevation partially broken away illustrating two inlets and the adjustable outlet therefor;

Fig. 5 is a section similar to Fig. 1 illustrating a reversal of certain parts and the operation of the device employing an alternate inlet.

Referring to the drawing in detail, the numerals of which indicate similar parts throughout the several views, 6 designates a basin supported on legs 7, comprising end walls 8 and 9 and side walls 10 and 11 integrally cast, and having a bottom 12. End wall 8 is shorter than its opposing wall and terminates above the bottom which, with converging extensions 13 and 14 of side walls 10 and 11, respectively, and a flange 15 laterally and outwardly extending from the lower end of wall 8, forms an auxiliary outlet chamber 16 adjacent the lower end of the basin. An upwardly protruding hub 17 is formed in the top of chamber 16 in which a T-fitting 18 seats, having a lateral outlet opening 20. Fitting 18 may be rotatably positioned in hub 17 in an arc of 180° to provide a most convenient connction for an outlet pipe 22, in which position it is then securely mounted by well known means. An opening 19 in the upper end of fitting 18 may be utilized as a vent, or pipe 22 may be vented in a well known manner and opening 19 closed by a plug 21 as illustrated in Fig. 1. A pair of tapped inlet openings are formed in and adjacent to the lower end of end wall 8, on opposite sides of fitting 18 and a third tapped inlet opening is formed in end wall 9, each of which openings being adapted for connection with a fluid inlet pipe 23. The openings not used are closed by plugs 24.

The lower portions of the side walls are inwardly offset to form upwardly facing shoulders 25 and 26 in horizontal alignment with the lower edge of wall 8 to provide a support of a false bottom 27 which is shorter than bottom 12. A pair of vertical abutments 28 on side walls 10 and 11 extend upwardly from each abutment 25 and 26 and are spaced from each other a distance equal to the length of bottom 27, and are also spaced equidistantly from end walls 8 and 9. The corners of bottom 27 are cut out to permit a sliding fluid-tight fit with vertical abutments 28. 29 indicates a rod and handle attached to false bottom 27 to facilitate its removal when desired. The grease trap chamber 30 comprising the area within the basin above bottom 27 is adapted for connection with a sub-chamber 31 below the false bottom by passages 32 and 33 between the ends of bottom 27 and end walls 8 and 9. The flow of fluid through each of inlet openings disposed in end wall 8 is dispersed throughout the basin by a perforated baffle 34 extending the width of the basin. Baffle 34 comprises a solid bottom plate 35 which normally closes the passage 32, seating on a flange 36 integrally formed with and inwardly extending from the lower edge of end wall 8. The edge of plate 35 opposed to that which seats on flange 36 is offset to engage the underside of false bottom 27. Baffle 34 further comprises a perforated inclosure having integrally formed a vertical section 37, an oblique section 38, and an upper horizontal portion 39, the latter extending to the end wall 8 above the inlet openings. The perforations 40 of baffle 34 are preferably conically shaped but may be of any size or shape desired. The baffle is held against lateral displacement by the adjacent vertical abutments 28 against which section 37 of the baffle rests.

A perforated outlet baffle 41 separates chamber 30 from passage 33, and being preferably identical in size and shape to baffle 34 with the exception of a bottom plate 42, which is narrower than plate 35 to restrict but not close passage 33, is adapted to seat on shoulders 25 and 26.

The upper edges of each of the four walls of the basin 6 are flanged at 43, in which flange a recess 44 is formed. A gasket 45 in the recess provides a seat for a basin cover plate 46. At each corner of the basin adjacent the upper ends of its walls a lug 47 is cast to which cover plate 46 is bolted.

In the operation of the embodiment of my invention shown in Fig. 1, the fluid from which grease is to be separated is admitted into the basin through either of the inlet openings in end wall 8 via pipe 23 and passes through the perforations 40 of baffle 34, passage 32 being closed. The fluid is spread throughout the basin by the baffle and the uniform velocity of its flow is retarded due to the increase of the cross-sectional area of the trap 30 with respect to that of pipe 23, permitting the grease and other lighter constituents of the fluid to rise to the surface. Heavier portions of the fluid pass through the perforations of baffle 41 through passage 33 and sub-chamber 31 to auxiliary chamber 16 for disposition via pipe 22. The dispersion of fluid from the inlet and the gradual concentration of fluid by baffle 41 prevents a direct flow of fluid from the inlet to passage 33 which would tend to prevent effective separation.

In the embodiment illustrated in Fig. 5, the baffles 34 and 41 are reversed, permitting the inlet openings in end wall 8 to be plugged and the admittance of fluid through the inlet in end wall 9. Thus the fluid passes first through the perforations of the baffle 34 as indicated by the arrows, and after flowing at a reduced velocity through grease trap 30 to permit the lighter constituents of the fluid to rise to the surface, then passes through baffle 41 and into chamber 31 through passage 32 between bottom plate 42 and end wall 8.

It will be seen that in the latter embodiment the false bottom and the outlet baffle 41 for opening 32 may be omitted, due to the fact that the inlet and exit openings employed are at the opposite ends of the trap chamber. The pressure on the fluid entering chamber 30 will be uniformly divided by baffle 34 and the fluid will be gradually converged by the walls 13 and 14 of auxiliary outlet chamber 16, obviating any tendency toward uneven flow through the trap.

While I have shown and described but one preferred embodiment of my invention, and have cataloged a few of the uses and advantages to which my invention is adaptable, I do not limit myself to the specific design, arrangement, size or proportion of the parts as outlined above and illustrated in the accompanying drawing, as it will be obvious to all of skill in the art that my invention is capable of numerous modifications in both construction and utility which are within the scope of the appended claims.

What I claim and desire to secure by Letters Patent is:

1. In a separator, a basin comprising a pair of side walls and two end walls and a bottom, said basin having an upwardly facing shoulder along opposite side walls, a false bottom of a width substantially equal to the width of said basin seated on said shoulders, forming a trap chamber and a sub-chamber above and below said false bottom respectively, said false bottom being of a length less than said bottom to form a passage connecting said trap chamber and said sub-chamber at one of the ends of said false bottom, and means to restrict said passage.

2. In a separator, a basin comprising side walls and end walls and a bottom, a shoulder formed along opposite side walls, a false bottom supported on said walls forming a trap chamber above and a sub-chamber below said false bottom, one end of said false bottom and the adjacent end wall forming a passage extending the width of said basin, connecting said trap chamber with said sub-chamber, an inlet opening in said basin adjacent the lower end of said trap chamber, a perforated baffle spreader comprising a bottom plate seated on said shoulders in said passage to restrict the same, and an inclosure wall within said trap chamber around said inlet opening slidable with the side walls of said basin through which fluid under pressure from said inlet opening is expelled under substantially uniform pressure throughout the width of the trap, and an outlet opening in said sub-chamber.

3. In a separator, walls forming a basin, an inlet opening in one end of said basin, an outlet opening at the end of said basin opposite to said inlet opening, a conduit from said outlet opening to the outside of said basin adjacent said inlet opening, and a fitting comprising a pipe connected rotatably in an upwardly directed opening in said conduit and in an upright position, said pipe having a side opening for connection with an outlet pipe and a vent at its upper end, and means to seal the connection of said pipe and conduit in any rotatably-adjusted position in the opening in said conduit.

4. In a separator, walls and a bottom forming a basin, a shoulder formed on opposite walls adjacent said bottom, a false bottom seated on said shoulder forming a trap chamber and a sub-chamber above and below, respectively, said false bottom, passages at opposite ends of said false bottom connecting said trap chamber with said sub-chamber, an inlet opening and an outlet opening in a wall of said basin above and below, respectively, said false bottom, an inclosure closing one of said passages and separating said inlet opening from said trap-chamber, said inclosure having a series of holes disposed over an area thereof larger than the cross-sectional area of said inlet opening and a second inclosure separating said trap chamber from the other of said passages and having holes disposed over an area thereof larger than the area of the passage inclosed thereby.

5. In a separator, walls forming a basin, an inlet opening in one end of said basin, an outlet opening at the end of said basin opposite to said inlet opening, a partition separating the portion of the basin in which the inlet opening is disposed from the outlet opening, said partition having a series of holes therein disposed over an area of the partition greater than the area of the inlet opening, a conduit from said outlet opening to the outside of said basin adjacent said inlet opening, and a fitting comprising a pipe connected in an upright position with said conduit having a side opening for connection with an outlet pipe and a vent at its upper end.

6. A separator comprising a basin, a partition in and horizontally dividing said basin, an inlet opening in said basin, an outlet opening in said basin at the opposite side of said partition from said inlet opening, said partition having a plurality of holes distributed over an area of said partition greater than the cross-sectional area of said outlet, said holes being of diminishing diameter, a conduit-fitting connected to said outlet opening having a side connection, and a vent in said conduit-fitting.

7. In a separator, walls and a bottom forming a basin, an inlet opening in one wall of said basin, a false bottom in said basin below said inlet opening shorter than the length of the bottom of said basin forming a subchamber between said false bottom and said bottom of said basin, an outlet opening in said basin below said false bottom, and a member to spread fluid discharged from said inlet opening into said basin above said false bottom.

8. In a separator, walls and a bottom forming a basin, an inlet opening in said basin and an outlet opening in said basin adjacent the bottom thereof, said walls forming a waste trap chamber between their upper ends, means connected in said outlet opening to drain fluid from said trap chamber above a predetermined level, and a perforated partition entirely below said last-named fluid level in said trap chamber separating said outlet opening from said waste trap chamber.

9. In a separator, walls and a bottom forming a basin, one end of said basin having an inlet opening therein adjacent the bottom of the basin, said basin having an outlet conduit connected therewith to drain fluid from said basin only from above a predetermined level therein, a partition entirely below said level separating the portion of the basin in which the inlet opening is disposed from the outlet conduit, said partition having a series of openings therein disposed over an area of the partition greater than the area of the inlet opening to spread fluid flowing through said partition in a direction substantially parallel to the bottom of the basin.

10. In a separator, walls forming a basin, one end of said basin having an inlet opening, said basin having an outlet opening therein, a partition separating the portion of the basin in which the inlet opening is disposed from the outlet opening, said partition having a series of openings therein disposed over an area of the partition greater than the area of the inlet opening, a conduit from said outlet opening to the outside of said basin having an upwardly directed opening therein, and a fitting comprising a pipe disposed in said last-named opening in an upright position and having a side opening for connection with an outlet pipe, and means to seal said fitting in said opening in any rotatably-adjusted position.

11. In a separator, a basin comprising a bottom, side walls and end walls, one of said end walls terminating above said bottom, the bottom of said basin being extended to form the floor of an auxiliary outlet chamber, said side walls having lateral converging extensions adjacent their lower edges forming converging side walls of said auxiliary outlet chamber, said last-named chamber having an outlet opening therein.

CHARLES ARNDT.